United States Patent [19]

Kwiat

[11] Patent Number: 5,931,959
[45] Date of Patent: Aug. 3, 1999

[54] DYNAMICALLY RECONFIGURABLE FPGA APPARATUS AND METHOD FOR MULTIPROCESSING AND FAULT TOLERANCE

[75] Inventor: Kevin Anthony Kwiat, Whitesboro, N.Y.

[73] Assignee: The United States of America as represented by the Secretary of the Air Force, Washington, D.C.

[21] Appl. No.: 08/861,252

[22] Filed: May 21, 1997

[51] Int. Cl.[6] .......................... G06F 11/00; G06F 11/08; H03M 13/00
[52] U.S. Cl. .............................. 714/48; 714/11; 714/774; 714/797
[58] Field of Search ...................... 395/188.01, 182.09, 395/185.01; 371/36, 41; 714/48, 11, 797, 774

[56] References Cited

U.S. PATENT DOCUMENTS

| | | | |
|---|---|---|---|
| 3,665,173 | 5/1972 | Bouricius et al. | 235/153 |
| 3,783,250 | 1/1974 | Fletcher et al. | 235/153 |
| 4,135,240 | 1/1979 | Ritchie | 364/200 |
| 5,621,720 | 4/1997 | Bronte et al. | 370/13 |

OTHER PUBLICATIONS

Kwiat, K.A., and Hariri, S., "Efficient hardware Fault Tolerance Using Field–Programmable Gate Arrays," Proceedings ISSAT International Conference on Reliability and Quality in Design, pp. 59–64, 1995.
Proceedings Sixth IEEE International Workshop on Rapid System Prototyping, Jun. 1995, "Modeling a Versatile FPGA for Prototyping Adaptive Systems", Kevin A. Kwiat, Warren H. Debany, Jr., Salim Hariri, pp. 174–180.
Proceedings Sixth Great Lakes Symposium on VLSI(IEEE), Jul. 1996, "Software Fault Tolerance Using Dynamically Reconfigurable FPGAs", Kevin A. Kwiat, Warren H. Debany, Jr., Salim Hariri, pp. 39–42.
Proceedings of the Third ISSAT International Conference on Reliability and Quality in Design, Mar. 1997, ISBN:0–9639998–2–6, Kevin A. Kwiat, Warren Debany, Salim Hariri, pp. 145–149, "Fault Tolerant and High Performance Computing with Dynamically Reconfigurable FPGAs" (Title).

*Primary Examiner*—Robert W. Beausoliel, Jr.
*Assistant Examiner*—Brian H. Shaw
*Attorney, Agent, or Firm*—Harold L. Burstyn

[57] ABSTRACT

Computing modules can cooperate to tolerate faults among their members. In a preferred embodiment, computing modules couple with dual-ported memories and interface with a dynamically reconfigurable Field-Programmable Gate Array ("FPGA"). The FPGA serves as a computational engine to provide direct hardware support for flexible fault tolerance between unconstrained combinations of the computing modules. In addition to supporting traditional fault tolerance functions that require bit-for-bit exactness, the FPGA engine is programmed to tolerate faults that cannot be detected through direct comparison of module outputs. Combating these faults requires more complex algorithmic or heuristic approaches that check whether outputs meet user-defined reasonableness criteria. For example, forming a majority from outputs that are not identical but may nonetheless be correct requires taking an inexact vote. The FPGA engine's flexibility extends to allowing for multiprocessing among the modules where the FPGA engine supports message passing. Implementing these functions in hardware instead of software makes them execute faster. The FPGA is reprogrammable, and only the functions required immediately need be implemented. Inactive functions are stored externally in a Read-Only Memory (ROM). The dynamically reconfigurable FPGA gives the fault-tolerant system an output stage that offers low gate complexity by storing the unused "gates" as configuration code in ROM. Lower gate complexity translates to a highly reliable output stage, prerequisite to a fault tolerant system.

23 Claims, 12 Drawing Sheets

DYNAMICALLY RECONFIGURABLE FPGA APPARATUS AND METHOD FOR MULTIPROCESSING AND FAULT TOLERANCE

STATEMENT OF GOVERNMENT INTEREST

The invention described herein may be manufactured and used by or for the Government for governmental purposes without the payment of any royalty thereon.

BACKGROUND OF THE INVENTION

The present invention relates to a fault-tolerant multiprocessor system, and, in particular, to a multiprocessor system whose fault tolerance is based in hardware rather than software. The present invention makes use of Field-Programmable Gate Arrays ("FPGAs") to improve fault tolerance provided in hardware.

Computer systems can fail in any number of ways. The failure can come from a fault in the electronic hardware or a bug in the software. To insure that the computer system continues to function in spite of an individual failure, such as the failure of an individual processor, one builds a fault-tolerant computer. Engineering fault tolerance into a computer generally requires that one replicate a processor or process with redundant components. That is, one has more than one component performing each function and a means, when the fault is detected, for locking the faulty component out of the process and, if necessary, shifting its function to another component.

Thus replicating processors is a straightforward method for contending with a range of system failures. Designers can add redundancy and implement fault tolerance with commercial, off-the-shelf processors, thereby avoiding the expense of designing fault tolerance into the processors themselves. Suppose we have two identical processors executing identical software. We can detect a fault with a bit-wise comparison of the redundant outputs.

Suppose it's the software that fails. Software faults are design faults. To compensate for such faults, redundant routines are designed to be functionally equivalent but different in their instructions. Their outputs may thus each be correct even though they are not identical. Direct comparison of the outputs is therefore inconclusive. Instead one must consider allowable variations in their outputs. These variations are unique to each function, so resolving redundant outputs to produce a single, fault-free output is much more difficult for software faults than for hardware faults.

One can design the hardware so that it accelerates the remedying of software faults. So, wherever the fault occurs in the computer system, it can be remedied without fail in hardware, software, or both, thereby insuring that the system is fault-tolerant, continuing to function without error in spite of the fault.

Many systems require fault tolerance only at certain times. And, even when it is required, the degree of fault tolerance can vary. Thus, instead of fixedly configuring processors for fault tolerance, one can develop flexible structures that maximize the use of processors. Where fault tolerance is not required, this flexibility can be translated into multiprocessing, where the available processors form either a single or multiple parallel machine(s).

Up to now, fault tolerance has not been implemented seriously in hardware. Current fault-tolerant digital computing systems based in hardware are designed with redundant modules, so that failure of a single module does not mean failure of the system. Such designs require unacceptable tradeoffs as fault tolerance is implemented. They carry an excessive overhead in the redundant modules that come into play only when a fault occurs. When the system exhibits no faults, the redundant modules do not contribute to its functioning.

Though prior-art hardware implementations may offer the fastest solutions, they are inflexible in their use of redundant resources. Thus current hardware implementations of fault tolerance are wasteful when applications do not require that each and every module in a system be reliable.

Prior-art software implementations add flexibility, but they introduce other limitations. Multiprocessors can configure their processors for fault-tolerant operation by distributing a "vote" among them. That is, each component offers its own solution, and the entire processor is structured so that a composite, or vote, of them all yields a correct result. In shared-bus multiprocessors, the serial nature of the bus impedes the voting process. Fully connecting the processors is a solution, but multiple connections complicate each processor's interface. In either case, however, when comparison and error detection for fault tolerance take place in software running on the processors themselves, then either fault tolerance must be added internally to the processors or assumptions must be made that severely restrict the types of faults tolerated.

Unlike hardware, however, software offers lower performance, because microprocessors that execute the software commands have fundamental limitations. A microprocessor is inherently serial, that is, it processes only one instruction at a time. A microprocessor's resources are limited, designed years in advance and fabricated into unchangeable silicon. A microprocessor can waste its resources, performing, e.g., only a single add per cycle while the rest of the logic circuitry sits idle, awaiting the result. Software implementations of fault tolerance may allow the most efficient use of redundant resources, but they do so only with considerable overhead.

The problem is threefold. For detecting hardware faults by output comparison of redundant computing modules, the underlying mechanism can be hardware or software based. Hardware-based mechanisms are fast, but the configuration of the modules is rigid. Software-based mechanisms permit flexible module configurations, but performance is slower. For detecting software faults among functionally redundant but differently designed software, the underlying mechanism must accommodate a multitude of programmer-created functions and allow variations between each redundant function. Because of size and power constraints, this complexity has prohibited a hardware-based mechanism for detecting software faults. As a result, software-based mechanisms have been the general rule for detecting software faults, and the speed advantages of hardware-based mechanisms have not been realized.

Thus there exists a need for a hardware-based fault-tolerant digital computing system that overcomes the drawbacks of current systems while preserving the speed advantages of hardware-based over software-based mechanisms for fault tolerance.

SUMMARY OF THE INVENTION

Using, as its logic and switching units, dynamically reconfigurable FPGAs of the type disclosed in U.S. Pat. Nos. 4,700,187 and 5,155,389 to Furtek, the disclosures of which patents are hereby incorporated by reference, the present invention provides an improved means for implementing multiprocessing and fault tolerance among computing modules.

The system must be flexible to maximize processor utilization. Otherwise the redundant resources are wasted when the application does not require the full complement of processors. A set of N redundant processors that normally operate in only N-Modular Redundancy ("NMR") can be apportioned for different fault-tolerant configurations. Given five redundant processors, then, in addition to 5-Modular Redundancy ("5MR"), other fault-tolerant processor configurations are possible: 4MR, 3MR (often referred to as Triple Modular Redundancy or "TMR"), and duplication with comparison ("DWC"). Allocation of only the number of processors an application needs frees the remaining processors for other applications. A single processor may be assigned to an application, e.g., when no fault tolerance is required, so that, even when a 4MR configuration is active, there can still be application concurrency.

An early innovation in computing was to store frequently used, unchanging software permanently in Read-Only Memory (ROM). A dynamically reconfigurable FPGA can provide the hardware complement to ROM storage. Infrequently used, changing hardware can be downloaded into the programmable logic elements of the FPGA.

Therefore, one object of the present invention is to provide apparatus and method embodied in hardware for fault-tolerant computing.

Another object of the present invention is to provide apparatus and method for fault-tolerant computing that makes use of FPGAs as logic and switching units.

Still a further object of the present invention is to provide apparatus and method for fault-tolerant computing that makes use of an FPGA's property of dynamic reconfiguration.

These and many other objects and advantages of the present invention will be ready apparent to one skilled in the pertinent art from the following detailed description of a preferred embodiment of the invention and the related drawings.

DESCRIPTION OF THE PREFERRED EMBODIMENT

Figure 1:
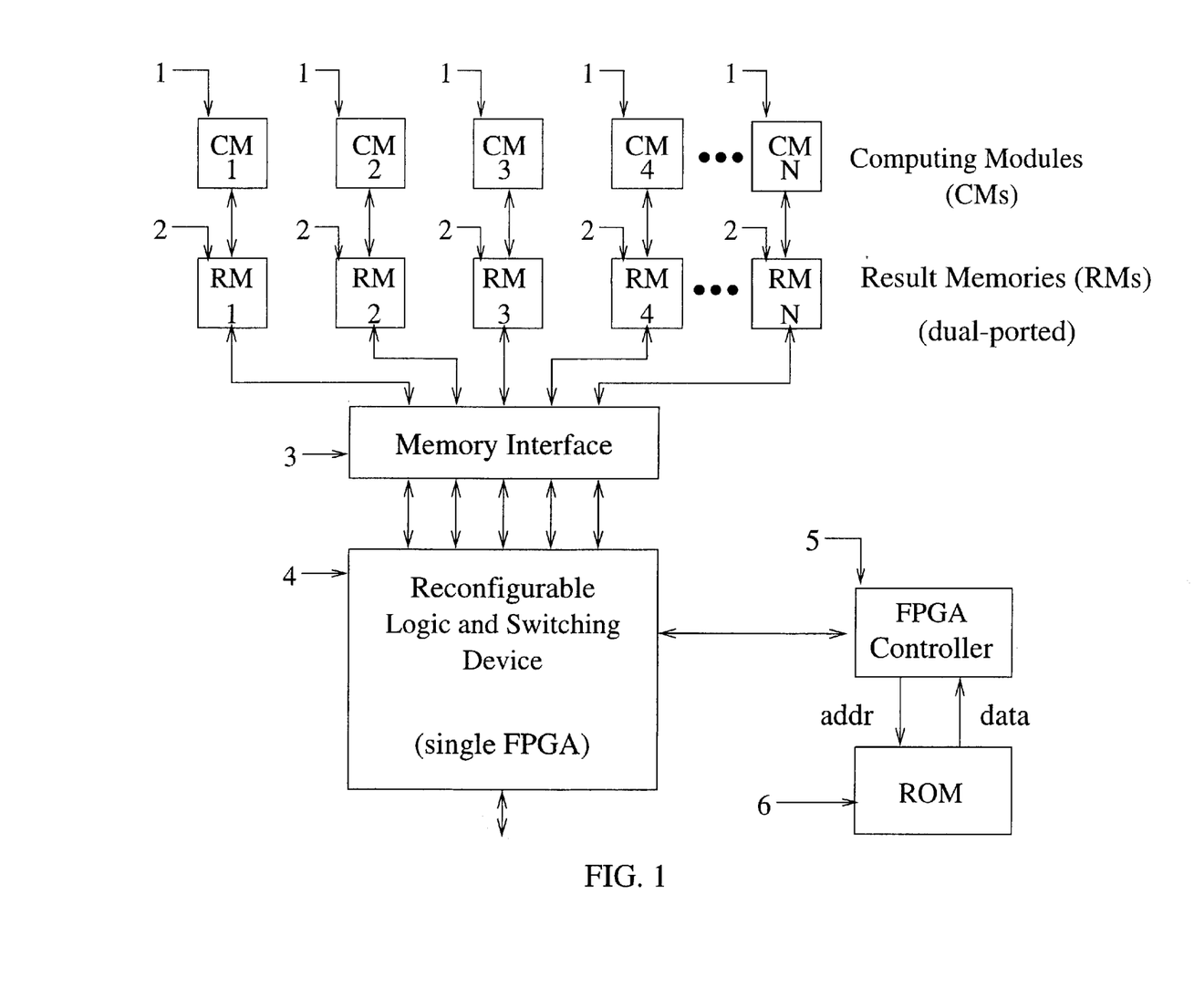
FIG. 1 is a block diagram of the dynamically reconfigurable FPGA apparatus and method for multiprocessing and fault tolerance of the present invention.

Referring to FIG. 1, the main components of the present invention include a set of computing modules ("CM") 1, each of which is paired with a dual-ported result memory ("RM") 2, a memory interface 3, a FPGA 4, a FPGA controller 5, and a ROM 6.

Each of the RM 2 memory locations is equally accessible from its associated CM 1 and FPGA 4. Communication between FPGA 4 and any CM 1 is through a message placed in its associated RM 2. An entry in the mailbox of any RM 2 indicates the presence of a message and the length of the RM data that accompanies the message. All RMs 2 share address and read/write lines, but individual enable lines permit FPGA 4 to selectively write or read from each RM 2. In both write and read operations, the data passes through FPGA 4. FPGA 4 provides direct support for fault tolerance and multiprocessing among the CMs 1.

FPGA 4 and each CM 1 check the message_destination_ bit in the mailbox. If this bit is 1, it indicates that FPGA 4 has sent a fresh message to CM 1 in the common memory space. CM 1 sets this bit to a 0 once it has read the message and responded to FPGA 4. Conversely, when the message_ destination_bit is 0, then FPGA 4 reads the message before it writes to the mailbox.

An application from the host is loaded in RMs 2. Once loading is complete, FPGA 4 sends a message to a mailbox in each RM 2. While they await tasks, CMs 1 poll their mailboxes. Tasks in different CMs 1 can execute concurrently.

While it waits for application output, FPGA 4 polls each RM 2. FPGA 4 speeds up the polling operation because it is configured to recognize the message result_ready. The mailboxes of all RMs 2 are read in parallel. When the binary code for the results_ready message is found in a mailbox, FPGA 4 raises the appropriate detection signal. Once FPGA 4 knows where the results are, it can determine what action to take. By comparing the detection signals for results_ ready with the allocation of modules to applications, FPGA 4 decides which application to select and what type of support (multiprocessing or fault tolerance) to provide. Scheduling a service to an application can follow any well-known algorithm, e.g., fixed priority; first-come, first served; or round-robin.

The cells of FPGA 4 are programmed and reprogrammed individually to perform a logic function. Cell program data are stored external to FPGA 4 in non-volatile ROM 6. Each cell is programmed without disturbing the programming of any other cell. Thus, once its programming is complete, a cell's logic function is unchanged by the programming of any other cell. This process defines dynamic reconfiguration. Reconfiguration can also occur concurrently with device operation, a process defined as configuration parallelism.

Because all its cells are reprogrammable, FPGA 4 can be used over and over again to perform many different functions, so groups of its cells make up virtual integrated circuits ("IC"s). FPGA 4 can be thought of as a board that contains sockets into which ICs can be plugged. Plugging in different ICs yields different board operations. The operations of FPGA 4 exhibit a locality of reference, thereby anticipating the need for future operations and issuing requests for their support in advance. Requests for board operations require "requesting" the necessary ICs, which then populate the board. A new IC is plugged into an already-occupied socket by writing over the cells of the currently unused resident IC. As the functions that comprise an operation are never all active at the same time, the operation can begin with only a subset of its functions. Because the board is modified dynamically, functions no longer needed are replaced during functional latency. The modification process must be controlled for two reasons: first, to ensure that the new placement supports the requested function; second, to ensure that the currently active function is undisturbed if configuration parallelism is used.

Figure 2:
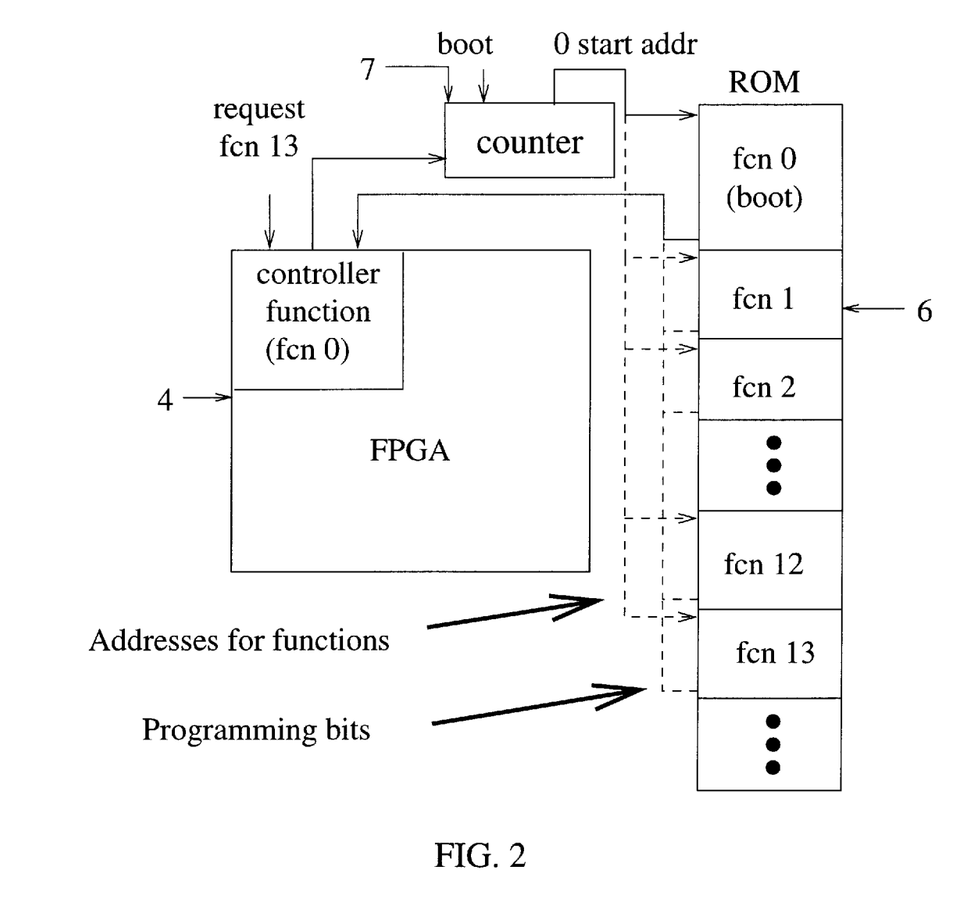
FIG. 2 is a block diagram that shows how dynamic reconfigurability is controlled in the present invention.

In the apparatus and method of the present invention, the control process itself uses dynamic reconfiguration. Referring to FIG. 2, the functions of FPGA 4 are partitioned into simpler functions. At boot-up, the initial controller function (fcn 0) is configured by loading a counter 7 set to 0. This is the starting address for fcn 0 stored in ROM. As the count proceeds, fcn 0 is loaded into FPGA 4 and the count is halted. All requests for functions from FPGA 4 are made through fcn 0. As shown, a request for fcn 13 is made to fcn 0. The starting address in ROM 6 is loaded into the counter 7.

Loading of fcn 0 is under control of the counter 7, where the address bits for accessing ROM 6 also address cells for programming FPGA 4. A binary code stored in ROM 6 indicates the end of function ("EOF"). The controller function fcn 0 halts the counter when it recognizes an EOF code. After boot-up, fcn 0 receives all function requests and coordinates dynamic reconfiguration of FPGA 4. FPGA controller 5 (see FIG. 1) has simply the structure of a counter 7.

Two types of cell addressing are used by fcn 0 to load a function into FPGA 4: (1) bits of the counter serve as addresses in programming successive cells, or (2) the address of a cell to be programmed is stored in ROM 6 along with the cell's programming data.

Functions are numbered according to the type of addressing they require. When a function request is made, inspection of the function number by fcn 0 determines how the programming data is fetched from ROM 6 and loaded into FPGA 4. In support of dynamic reconfiguration, fcn 0 offsets the target cell address to steer it to an inactive area of FPGA 4. In either type of cell addressing, function loading is complete when fcn 0 detects an EOF code. Thus the EOF code cannot be located in the code space for the cell's programming data or address.

Since it coordinates the dynamic reconfiguration process, fcn 0 is never overwritten by another function; this behavior is analogous to the implementation of a page-replacement algorithm in main-memory management fcn 0 can never be paged out to disk because it would have no way to return.

FPGA 4 can be configured for both types of operations by changing only a few cells. Partial reconfiguration changes the device's function while maintaining its structure, so that a minimum time is required to switch between operations.

Figure 3:
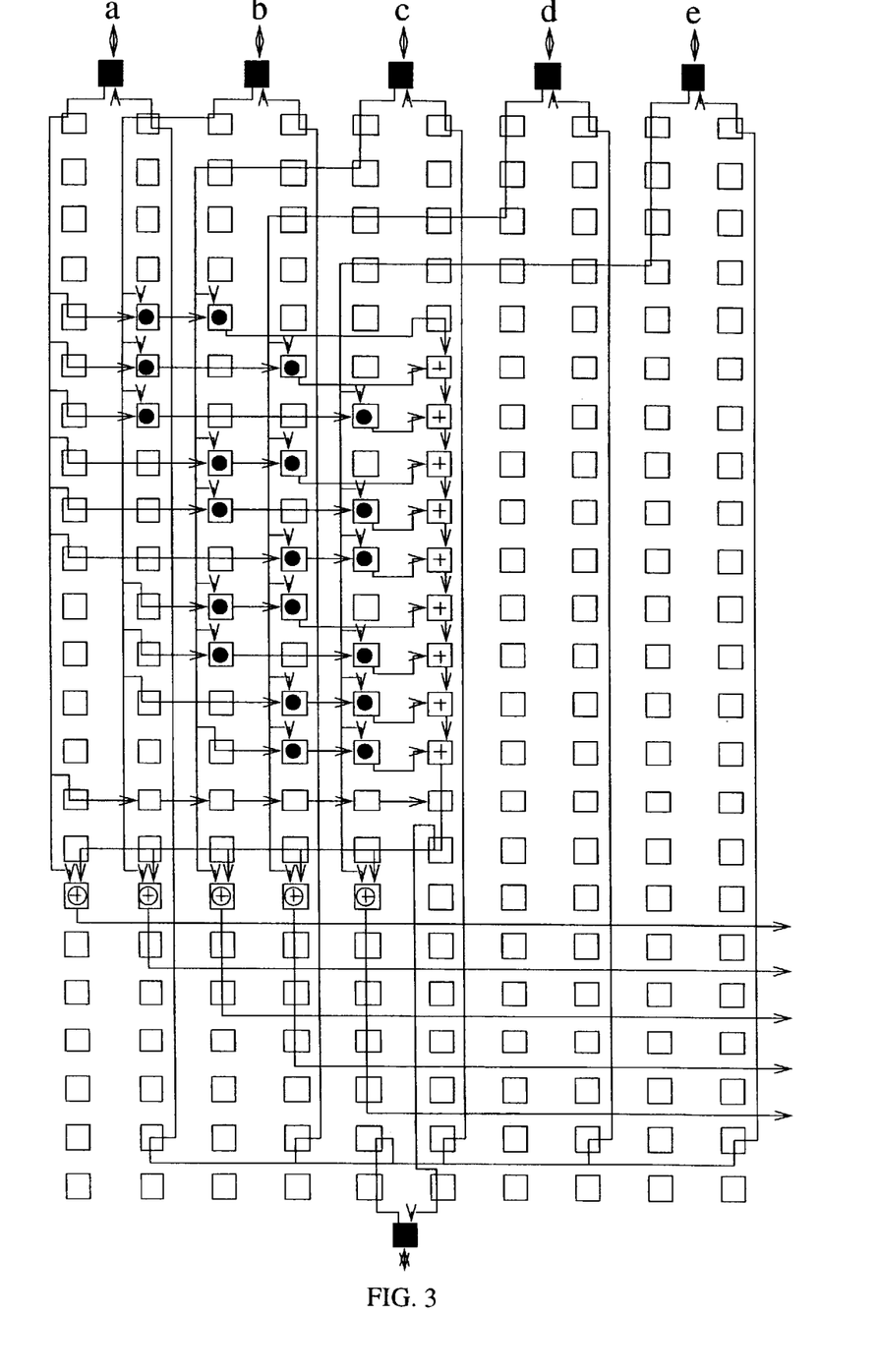
FIG. 3 shows how to implement a bit-slice 5 Modular-Redundancy (5MR) voting circuit in a FPGA.
Figure 4:
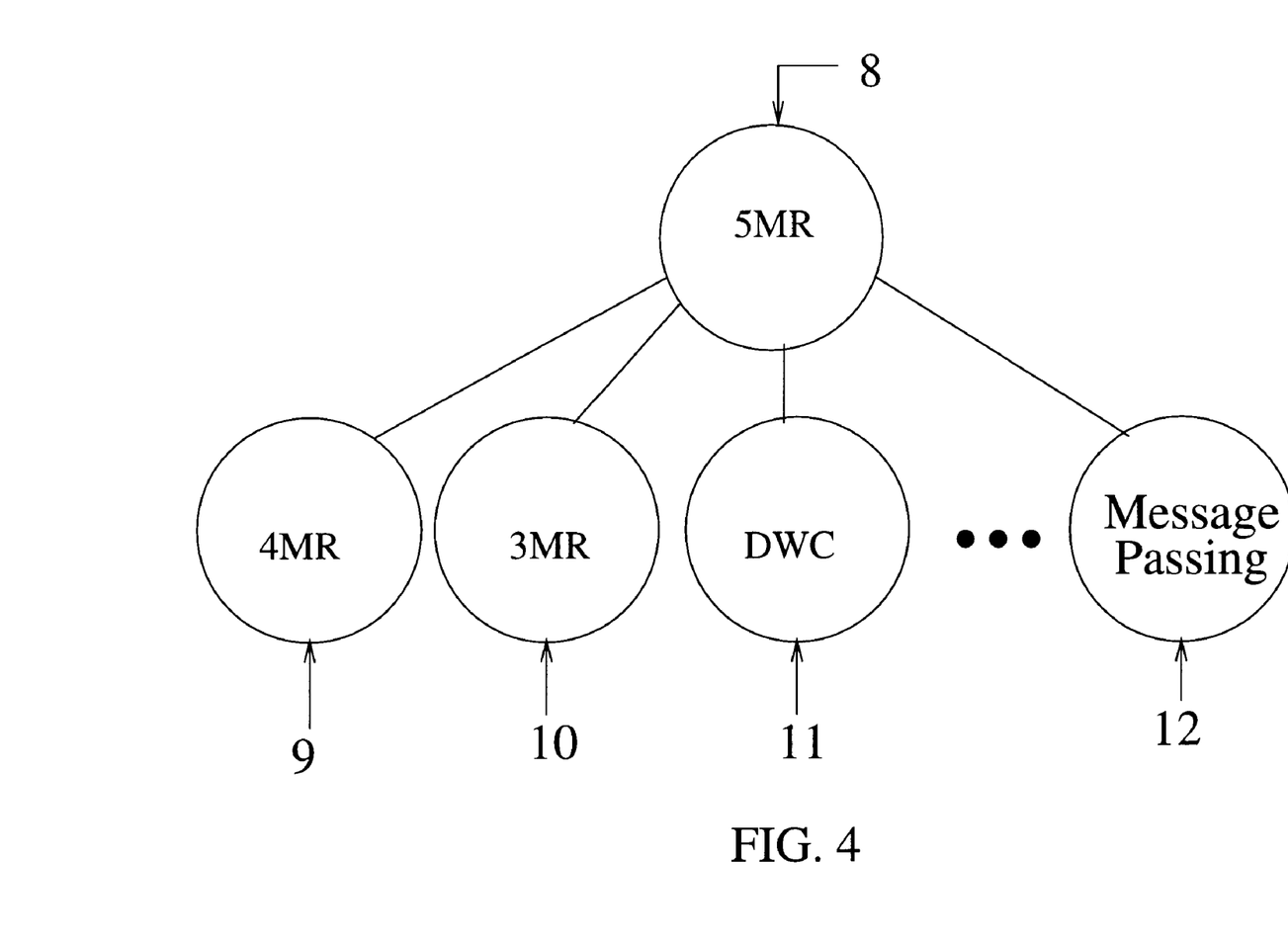
FIG. 4 shows incremental reconfiguration in the present invention.

Though each CM 1 has a physical connection to FPGA 4, an application that is not executing on all modules uses only a subset of these connections. The other connections still have an electrical value on them, and, if these values are used, an erroneous output could result. Therefore these inputs must be ignored. For fault-tolerant applications, FPGA 4 is programmed so that the majority function, expressed as a sum-of-products implemented in a logic network, can be reduced to the majority function of fewer inputs. Su and DuCasse ("A Highly Efficient Redundancy Scheme: Self-Purging Redundancy," C-29 IEEE TRANSACTIONS ON COMPUTERS (No. 3, March 1980) 254–257) have shown that, since the majority function is symmetric, a 3MR is easily obtained from a 5MR by replacing any one variable by a 0 and any other variable by a 1. Referring to FIGS. 3 and 4, with a 5MR voter 8, some cells are programmed to a constant 1 or 0 to implement a smaller function by only "programming" gate elements. That is, there is no need for steering logic, new elements, or a change in interconnect. When converting from 5MR voter 8 to a 4MR voter 9, the unused variable is replaced by a 0, which eliminates all the product terms with that variable. The remaining terms express the majority function of the four variables. In FPGA 4, if the vote involves fewer than five inputs, some cells are programmed to disable the detection signals of those CMs 1 that do not participate in the vote. For a DWC comparator 11, some cells in 5MR voter 8 are programmed to route the outputs from the two participating CMs 1 to the voter's disagreement detector for comparison. Results from one of these CMs 1 also serve as the primary output from FPGA 4. Routing is similarly performed in passing a CM 1 output as an interprocessor message. Support for other fault-tolerant ("FT") operations and multiprocessing ("MP") are derived from the FPGA 4 configuration for 5MR. FIG. 4 shows the relationship between FPGA 4's configurations as a rooted tree, with 5MR voter 8 as the root and other configurations as the leaves, e.g., a 3MR voter 10 and a Message Passing Unit 12.

To minimize both reconfiguration time and the number of distinct configurations that must be stored, the apparatus and method of the present invention rely on incremental programming to transition between standard configurations. For example, to switch from 3MR voter 10 to DWC comparator 11, 3MR voter 10 is first reconfigured to the predecessor 5MR voter 8. From there, 5MR voter 8 is reconfigured to the successor DWC comparator 11. During operation of the apparatus of the present invention (see FIG. 1), when there is uncertainty about what function will be needed next, the default configuration of FPGA 4 is 5MR voter 8. In this way, the other configurations can be reached in minimum time.

FIG. 3 shows a bit slice of the design of FPGA 4 that supports 5MR voter, 8, 4 MR voter 9, 3MR voter 10, and DWC comparator 11. Extending this design can support NMR, nMR (where n<N), and DWC. The darkened squares are bidirectional I/O pads; the undarkened squares, logic cells. In this representative layout, five modules (a through e) are connected to the top I/O. Some cells rout; others perform a logic function. The symbol "•" in a cell indicates that the cell performs an AND function, a "+" indicates an OR, and a "⊕" indicates a XOR. Arrows indicate the direction of signal flow.

FIG. 3 shows the core design of FPGA 4. All other nMR voters 8–10 and DWC comparator 11 are derived from this design. In the design of FPGA 4, individual cells are identified by their row and column coordinates indexed from 1, with cell (1,1) at the top left corner. The six cells (15, 1) through (15, 6) rout any single input to FPGA 4 to the output. In the core design, the first five of these cells each pass their input to their eastern neighbor, while the sixth cell passes its northern input to its output. Only cell (15, 6) and one more cell require reconfiguration for routing either a, b, c, d, or e to the output of FPGA 4. For example, input c is routed by programming cell (15, 3) to accept c from the bus instead of from the output of its western neighbor. Now c flows to the input of cell (15, 6), which has been programmed to pass to its output its western input instead of its northern input. The submatrix of cells from row 5 to row 17 and from column 1 to column 6 performs the sum-ofproducts majority function with disagreement detection. The majority output is routed from cell (14, 6) to the bottom I/O. The outputs of cell (17, 1) to cell (17, 5) are the disagreement signals, shown being routed to the right where each signal is ORed with the remaining respective error signals from its module output bits to create a single error signal for each module. This results in an N-bit vector. For applications in the FT mode, FPGA 4 inspects the N-bit vector and indicates when either (1) no majority exists (NMR function) or (2) a miscompare (duplication with comparison function) occurs. FPGA 4 does this by feeding the vector to an N-bit summer whose output vector, SUM, indicates the number of errors. Clearly, a fault-tolerant application that uses n (n≦N) redundant CMs 1 must satisfy the condition SUM<⌉n/2⌈ before its output can be accepted. Otherwise, the fault-tolerance capacity for the application has been exceeded. FPGA 4 performs the comparison described above, raising the failure signal if the condition is not met. When the gates are implemented in cells of FPGA 4, they can be programmed to output constant 1s or 0s.

Next, an example will show how 5MR voter 8 is converted to 3MR voter 10 by programming some cells of FPGA 4 to output a constant, either 1 or 0. The output of FPGA 4 is the majority of b, c, and d, and the proper error detections are enabled when the following steps are performed:

Program cell (1, 1) to output a constant 1 and cell (1, 9) to output a constant 0.

Program cell (17,1) and cell (17, 5) to output a constant 0.

Now assume that modules a and e are being used in the DWC mode. To switch from 3MR operation to DWC using a and e, FPGA 4's cells in the 3MR configuration that are different from the core design are first programmed back to their original state. To create the compare function for a and e, the following steps are performed:

Program cell (15, 5) to route e from the bus to its output.

Program cell (17, 2), cell (17, 3), cell (17, 4), and cell (17, 5) to output a constant 0 to disable all error detection except between a and e.

This example demonstrates how the core design of FPGA 4 can support, directly in hardware, fault-tolerant operations on all N modules and every combination of fewer modules. FPGA 4 is also configured to recognize the presence of a 0 message_destination_bit. Programming cell (14, 6) to output the opposite binary value from the one to be recognized causes the XOR cell to raise the detection signal when the desired bit is found. Making the message_destination_bit the lower-order bit in the mailbox causes the higher-order bits in the message to be ignored during polling, so the cell that corresponds to cell (14, 6) outputs a constant 1 for detection of a 0 message_destination_bit. When FPGA 4 issues a write/read to any RM 2, the bi-directional I/O pins in Memory Interface 3 (see FIG. 1) are switched accordingly. When the data source for a write operation is the host, routing in FPGA 4 is from the bottom I/O pins to the top I/O pins of FIG. 3.

Figure 5:
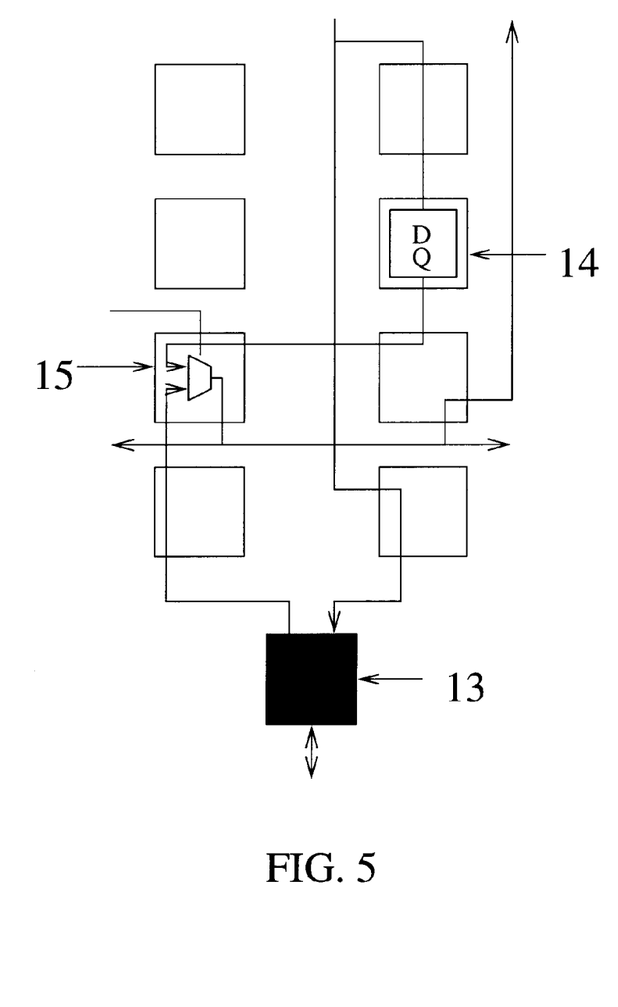
FIG. 5 shows the FPGA subcircuit for intertask message transfer in the present invention.

FIG. 3 is a representative layout. A more compact routing of signals through FPGA 4 to the RMs 2 exists, but the layout shown here is easier to follow. To show how FPGA 4 supports the transfer of data between RMs 2 for message passing, examine the collection of cells near the bottom of FIG. 3. An I/O pad 13 and six cells that correspond to the bottom of FIG. 3 are enlarged in FIG. 5, which shows that the output of FPGA 4 can be stored by using a cell as a flip-flop 14. Another cell serves as a two-input multiplexer 15 with output select provided by FPGA 4. Using the circuit of FIG. 5, data read from a source RM 2 into flip-flop 14 can be routed through multiplexer 15 to the FPGA 4/RM 2 interface. From there the data are written to at least one destination RM 2. Note that the data could also pass through configurable 5MR voter 8 (see FIG. 3 for fault-tolerant message passing within a combined FT and MP application. Once communication is initiated between applications, the circuit of FIG. 5 allows minimum movement of data for message transfer from source RM 2, to FPGA 4, to destination RM 2.

The present invention thus preserves the flexibility of a software-intensive approach while demonstrating the potential of implementing operations directly in hardware. Assisting operations is FPGA 4, which is designed for easy modification of its internal function to provide its services readily. Majority voting or DWC are not the only ways to produce a fault-free output. In cases where correct results may not completely agree or a reasonableness check is performed, algorithms whose complexity exceed that of majority voting are required.

The underlying cause of failure of a software component is in its design, as pointed out by Lee and Anderson (*Fault Tolerance: Principles and Practice*, 2 Ed., 1990). Software fault tolerance therefore encompasses various techniques to mitigate the fault. Each of these techniques adds extra software to the component to make it fault-tolerant. A critical part of this software checks to initiate, if the component has experienced an error, the corrective action that leads to fault tolerance. Because the faults to be tolerated are design faults, the checking routine is intrinsic to the software component, and the routines are as varied as the software components themselves.

This discussion of software fault tolerance illustrates the present invention by showing how wide a variety of checking routines are necessary to implement software fault tolerance. Because of the large number of checking routines required for detecting software faults, a software-intensive solution need not be the only choice. The apparatus and method of the present invention provides a hardware mechanism in a flexible manner. The single, dynamically reconfigurable FPGA 4 provides the same functionality as a software-intensive solution. The present invention improves on a software-intensive solution for fault-tolerance by performing the checks with the speed of a hardware solution.

Because processor failures can defeat fault tolerance when the processor checks its own execution, the application software is checked independently of the module executing the application. FPGA 4 acts as a coprocessor to the module running the application. Separating the application and its associated fault-detection mechanisms moves error checking from the executive processor to its coprocessor, thereby allowing the executive to proceed while the coprocessor checks for an error. In the rare event that an error occurs, the coprocessor notifies the processor to halt and rollback its execution to the point where the error was detected.

In this section, examples of checking routines for each of the two main software techniques for fault tolerance, N-Version Programming ("NVP") and the Recovery Block ("RB") method (see Lee and Anderson), are described as implemented by the present invention.

FIRST EXAMPLE

NVP comprises N functionally-identical versions of a program (N>1), each independently designed to satisfy a common specification. The results of executing N versions are compared by some form of replication check. In NVP, this check is often called "inexact voting" because the outputs of the N versions may not be exactly the same but are nevertheless all considered correct according to tolerances in the specification. An algorithm for inexact voting could be very complicated, and a general algorithm for determining if the N inputs are different from one another within an allowable range applicable to any application is not possible to formulate, as pointed out by Goel and Mansour ("Software Engineering for Fault-Tolerant Systems," Rome Laboratory Technical Report, RL-TR-91–15, March 1991).

Figure 6:
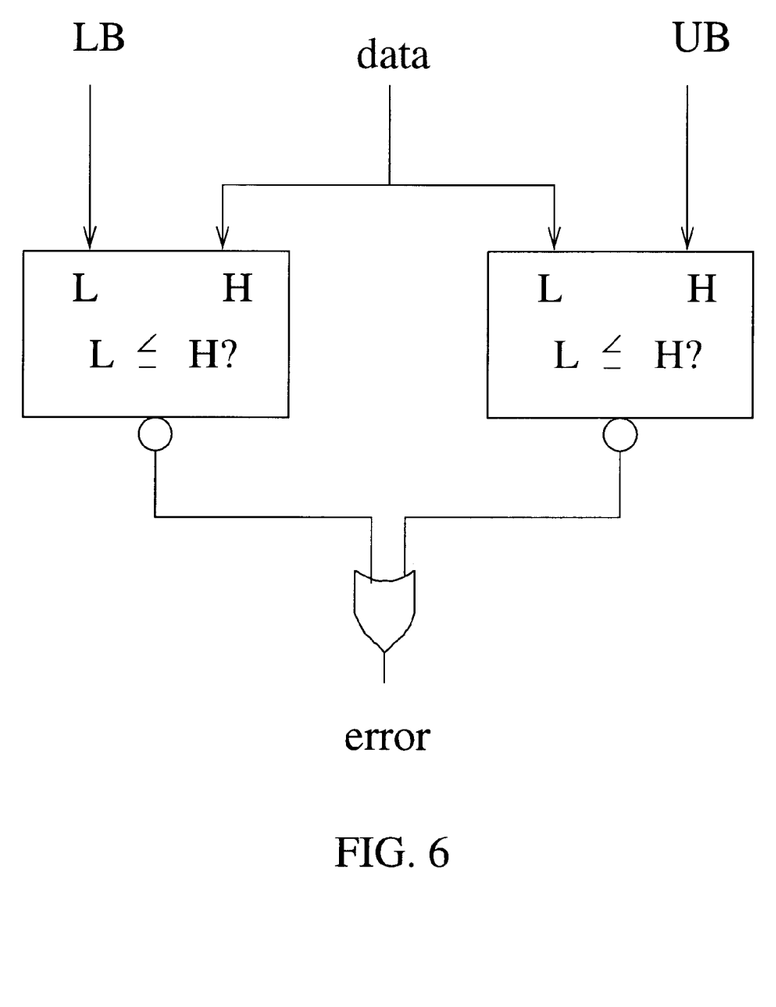
FIG. 6 is a block diagram that shows an example of bounds checking in the present invention.
Figure 7:
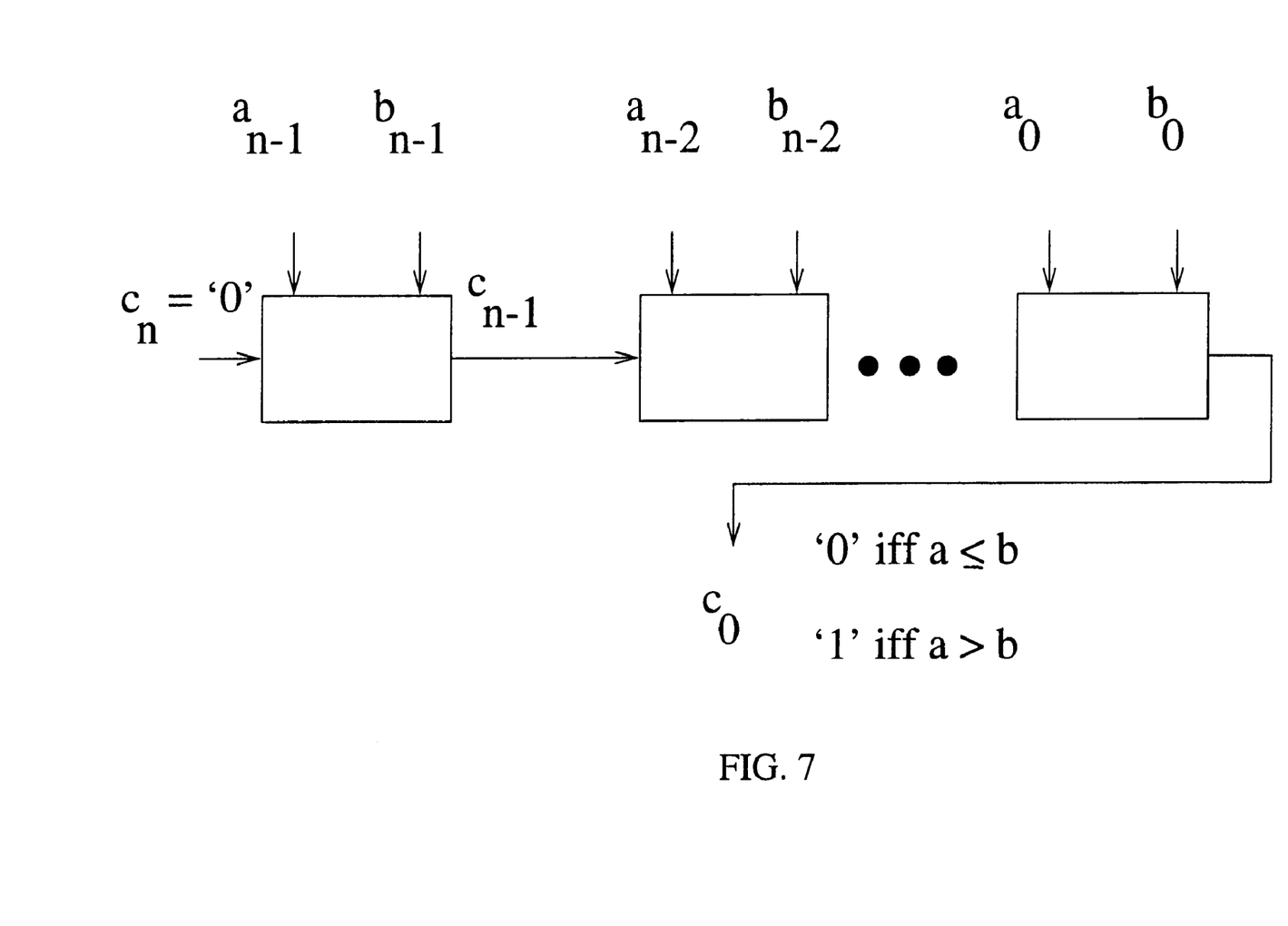
FIG. 7 shows a bit-slice design for bounds checking in accordance with the example of FIG. 6.

A function that checks that an output is within a certain range is an elementary form of inexact voting, as pointed out by Burns and Wellings (*Real-Time Systems and Their Programming Languages*, 1990). FIG. 6 shows the block diagram for the checking circuit where, in addition to the input data being checked, the LB input specifies the lower bound, and the UB input specifies upper bound. FIG. 7 shows how the checker for either the upper or the lower bound is decomposed into a bit-slice for each bit of an N-bit input vector. In conventional cell-based VLSI design, a macro with the gate-level representation shown at the top of FIG. 8 would be used for each stage. In a custom design, the penalty for routing the inputs for data, LB and UB, to the checker is much less than in a direct FPGA implementation. More circuitry is needed in FPGA 4 because the circuit's layout has to be spread over a wider area in the array to allow sufficient access by the programmable interconnect. Also, several of FPGA 4's cells are needed for routing, so the combined effect is a circuit that is less efficient in chip area and has much greater path delay.

Figure 8:
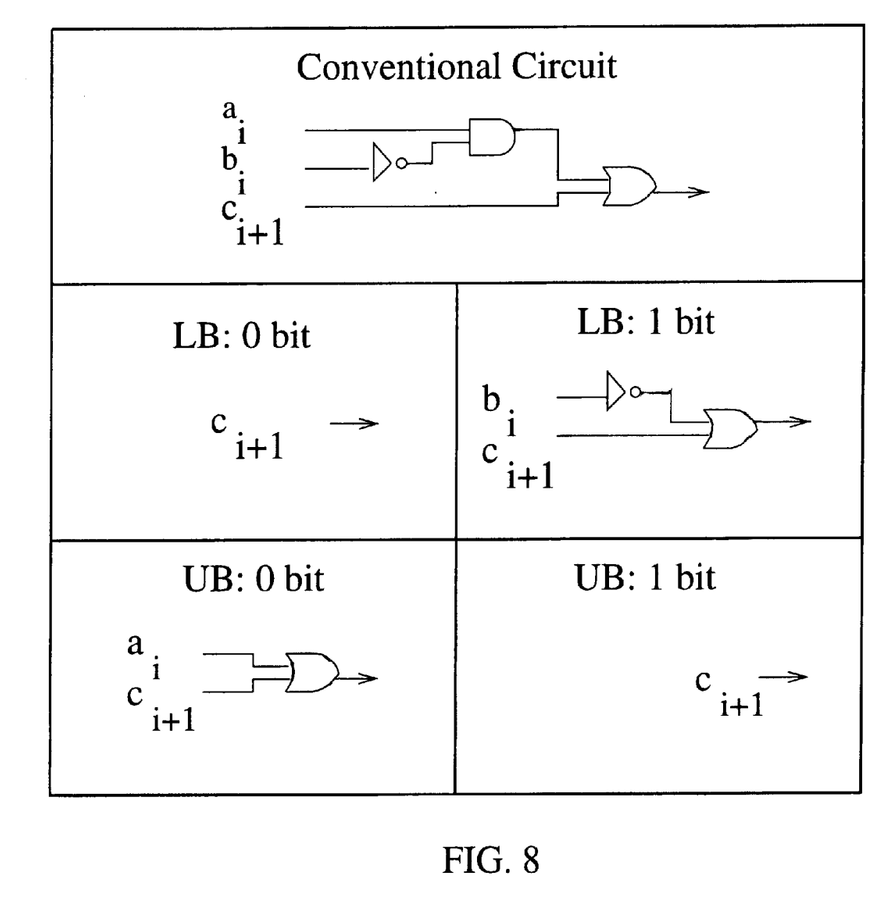
FIG. 8 shows how data can be folded into FPGA cells in the present invention.

However, the partial-reconfigurability of FPGA 4 offers a more economical realization. Data folding, described by Foulk ("Data-Folding in SRAM Configurable FPGAs," *Proceedings of the First IEEE Workshop on FPGAs for Custom Computing Machines*, 1993.), allows a circuit that performs a function on specific data to be optimized for those data; that is, constants can be hardwired into the circuit. In the case of the range check, the LB and UB are constant for the set of input data, so an alternative FPGA implementation offers better routing opportunities. FIG. 8 shows how the stages are modified based on each bit value of the bounds. Once the bounds are folded-in, at most two signals are needed per stage, and the number of gates that the FPGA has to implement per stage is also at most two. In the FPGA implementation, the checking operation must stop when the bounds change, to give time for FPGA 4 to partially reconfigure itself. The time to reconfigure depends on the Hamming distance between the new and old bounds.

Reconfiguration that takes place concurrently with device operation is called configuration parallelism.

SECOND EXAMPLE

In this technique, alternate algorithms are available to perform a given task. Associated with these algorithms is an acceptance test, and together they comprise a recovery block ("RB"). When an RB is entered, the primary alternate executes first. If its results are not acceptable, the remaining alternates are invoked sequentially until the acceptance test is passed. The acceptance test is the most critical component of the RB. It must be complete enough to evaluate the performance of each alternate, as described by Goel and Mansour.

Figure 9:
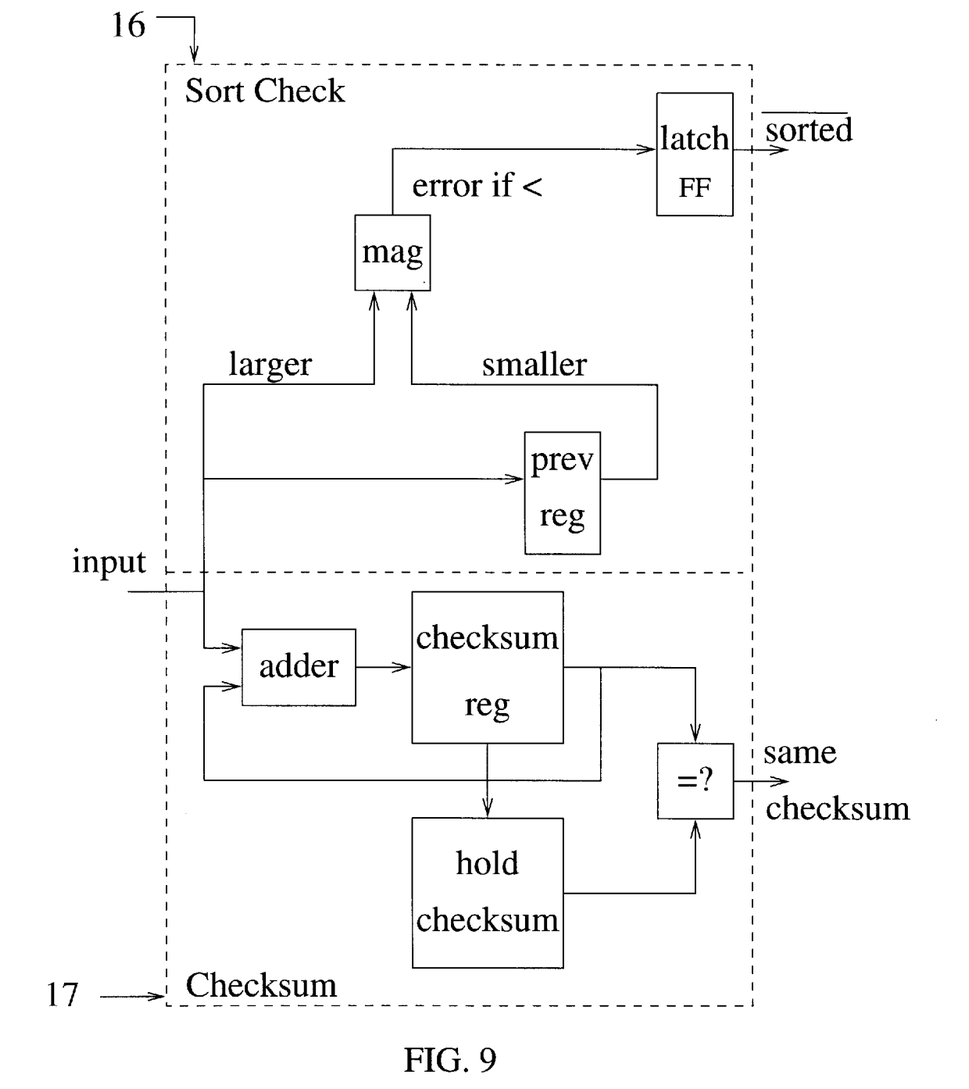
FIG. 9 is a block diagram that shows checking the order of a sort and the number of sorted elements in the present invention.

The following example of an RB (see both Lee and Anderson and Goel and Mansour) demonstrates this technique. An RB sorts a list, S, of elements. The acceptance test performs two checks: (1) are the data sorted correctly? (2) are the sums of the elements from the sorted and unsorted list the same? A SortCheck 16 verifies the order of the elements in the sorted list. A CheckSum 17 sums the elements of S as sorted and prior to sorting (S+Prior (S)) and checks for equality. This operation ascertains that no elements were dropped or inadvertently repeated during formation of the sorted list.

Figure 10:
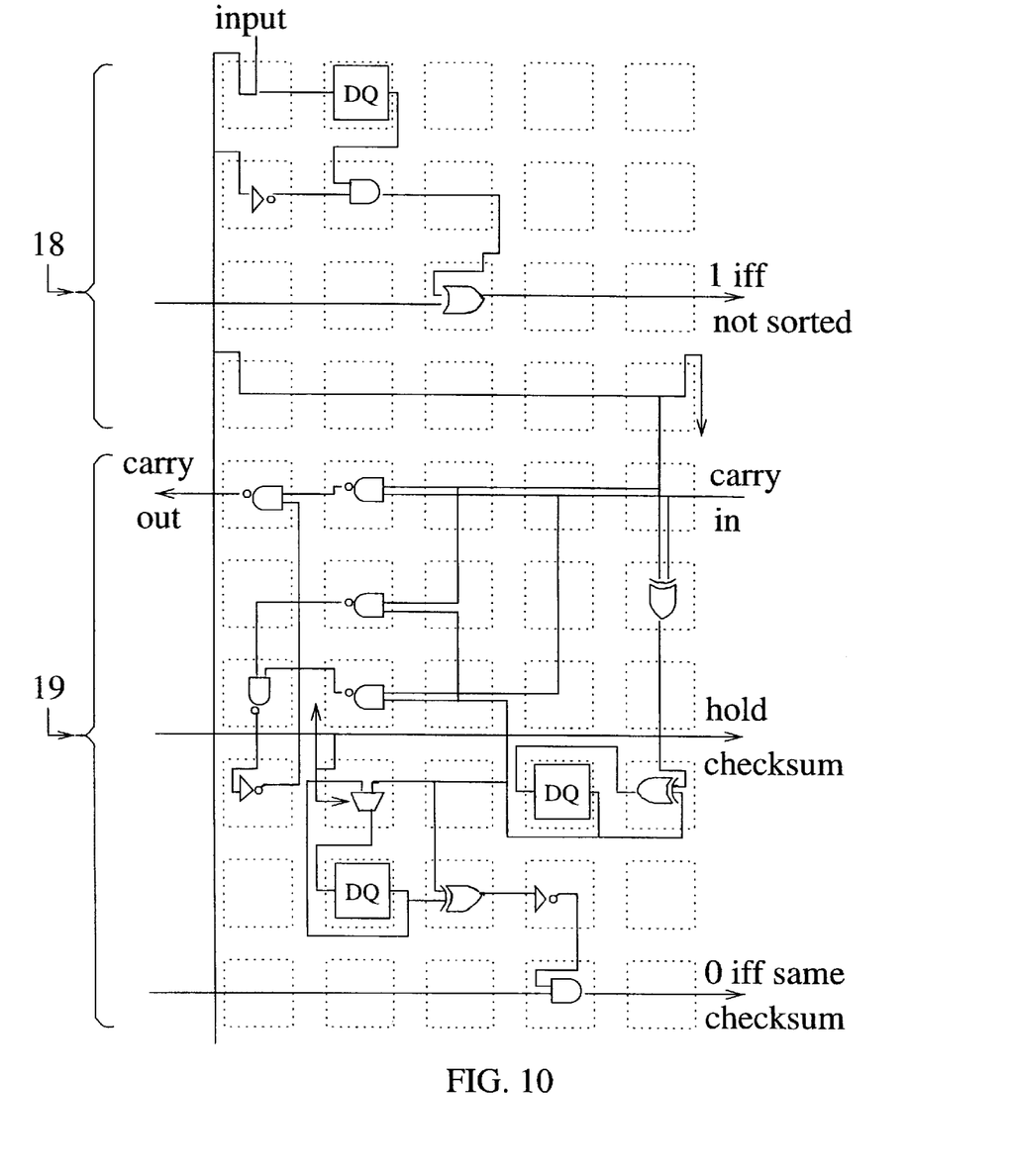
FIG. 10 shows the FPGA layout of a bit-slice representation of the block diagram of FIG. 9.

Now consider an FPGA implementation of the checking functions. FIG. 9 shows the block diagram of the circuit to be implemented. Note that CheckSum 17 requires the data prior to and after the sort, while SortCheck 16 needs the data only after the sort is complete. This functional latency allows exploitation of configuration parallelism: SortCheck 16 is configured into FPGA 4 while the device performs CheckSum 17. FIG. 10 shows a single stage of a bit-slice design for checking. The top three rows of the array perform a SortCheck 18, and the remaining seven rows perform a CheckSum 19. As shown in the block diagram of FIG. 9, it is necessary to configure a cell at the output stage of SortCheck 16 as a latch flip-flop to capture the error signal.

A simplistic approach to configuration parallelism is to partition the chip into distinct areas. This is the same as creating a chip within a chip and is essentially no different than having two non-dynamically reconfigurable FPGAs that are programmed independently. In the more versatile approach for FPGA programming, the functions are not necessarily confined to distinct chip partitions. Instead the areas they occupy may overlap. If they do, configuration parallelism stops once either the row or the column coordinate of a cell to be programmed intersects with the area of the active function. Programming is resumed when the active function has completed. For true configuration parallelism, any available logic resources should be of potential use; however, careful preplanning is required. For example, the cell in the upper-left corner of FIG. 10 is the fanout origin of the input signal. Though this cell is in the area of SortCheck 18, it is necessary to configure it prior to initiating CheckSum 19. Configuration of the remaining cells for SortCheck 18 take place during operation of CheckSum 19.

THIRD EXAMPLE

As a final example of dynamic reconfiguration, we consider an extension to the earlier example of the recovery block scheme. Assuming the RB has been performed successfully, we now wish to transmit the sorted data reliably. We do this by having the FPGA perform a cyclic redundancy check (CRC). The encoding for the CRC is performed independently and in parallel over the several serial-bitstreams. The CRC check bits for each bitstream are generated during transmission and appended to the end of the block (see Siewiork and Swarz, *Reliable Computer Systems: Design and Evaluation*, 2 Ed., 1992).

Figure 11:
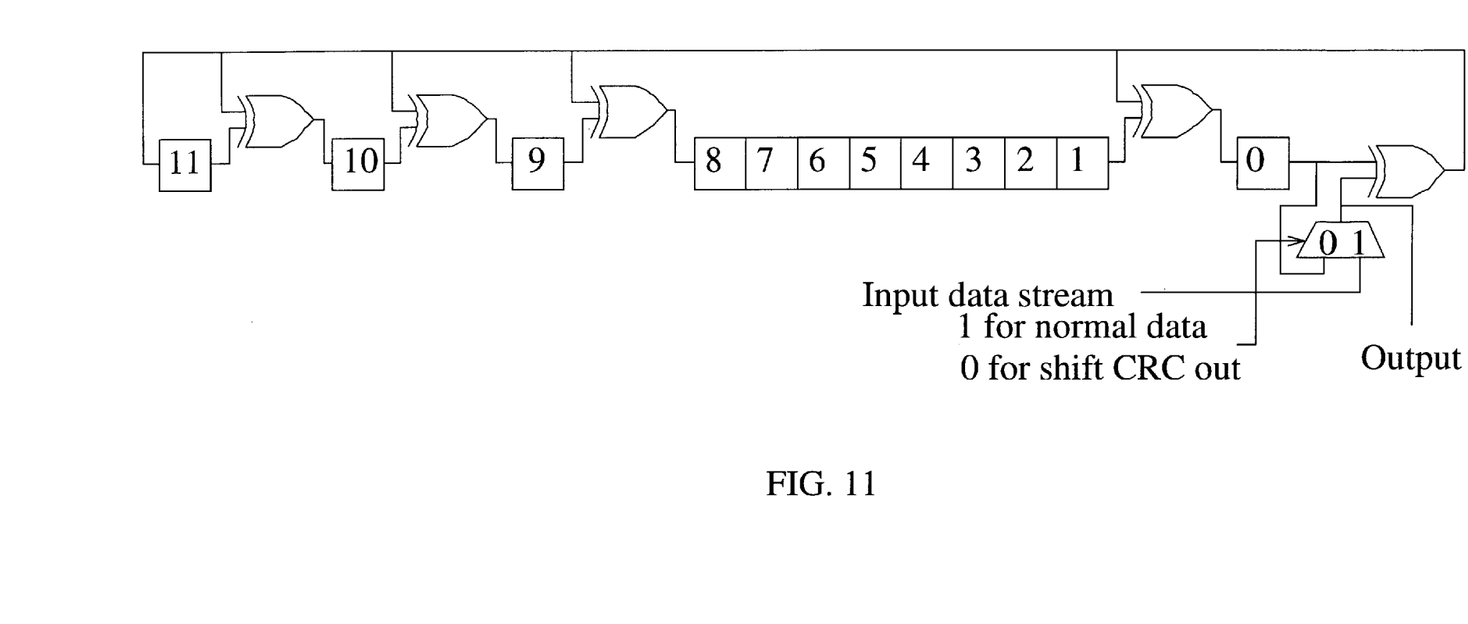
FIG. 11 shows a gate-level diagram of a circuit for a Cyclic Redundancy Check ("CRC") in the apparatus of the present invention.
Figure 12:
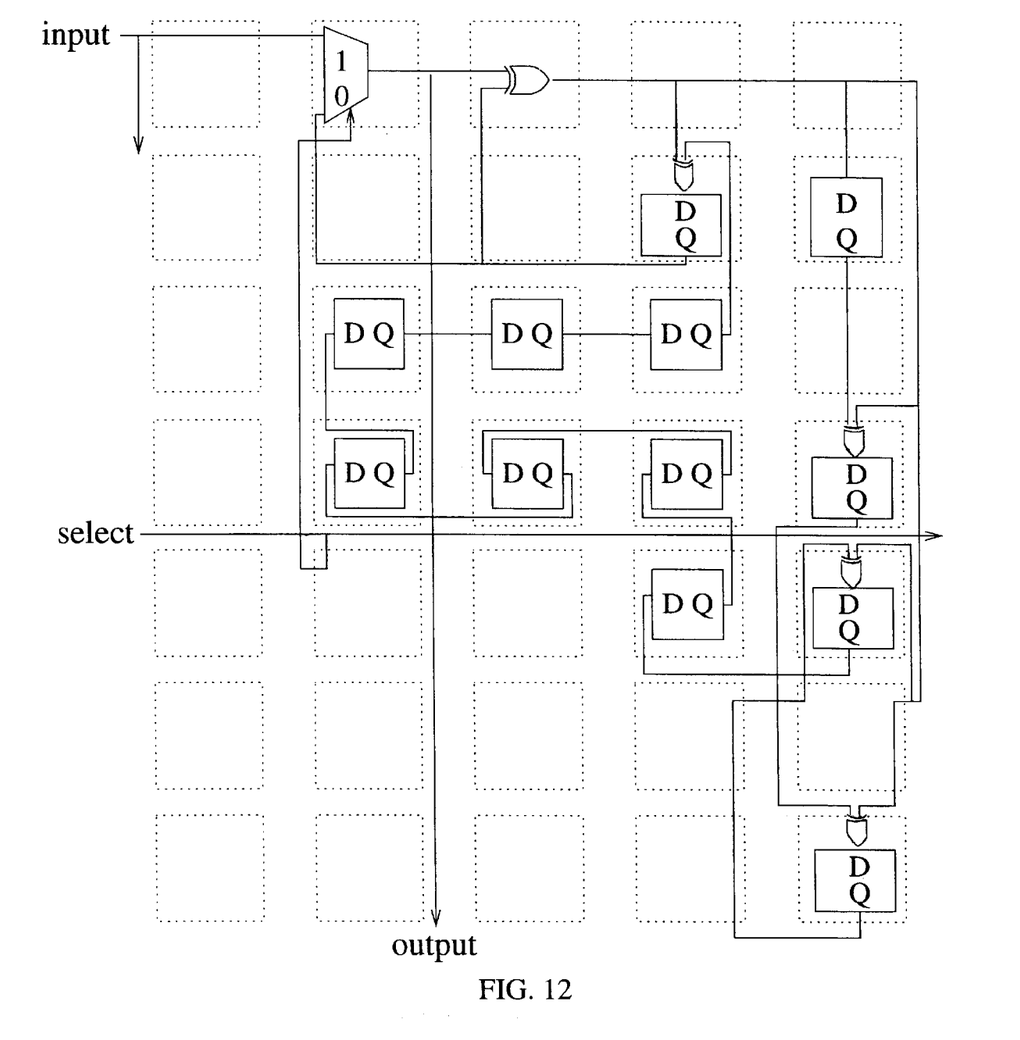
FIG. 12 shows the FPGA layout of a bit-slice representation of the gate-level diagram of FIG. 11.

A 12-bit linear-feedback shift register encoder for a CRC-12 cyclic code is shown in FIG. 11. The FPGA implementation is shown in FIG. 12. By overlaying this layout onto the layout of CheckSum 19 shown in FIG. 10, we see that not all of the cells of CheckSum 19 need changing. In fact, 18% of the cells in CheckSum 19 have the same functionality in both designs. Preserving cell configurations in CheckSum 19, by programming only the differences, reduces the time to configure the CRC-12 encoder by 25%.

The architecture of the present invention is flexible. Processors do not have to be tightly synchronized, and the present invention permits combinations of applications for efficient and effective processor utilization. Global considerations include tolerating faults in the software by means of functionally redundant, but differently designed, software. Although software faults are design faults, architectural support is required if these faults are to be tolerated efficiently in the field. Voting algorithms yielding multiple results that are each correct but may not all agree, or performing a reasonableness check on a process, are essential for software fault tolerance. However, until now, hardware implementations for these algorithms or checks have not been seriously considered. The reconfigurable hardware of the present invention realizes benefits similar to those software realizes from virtual memory management.

The reliability of a fault-tolerant system cannot exceed the reliability of its output stage. That is, the reliability of the element that resolves the outputs of the redundant CMs 1 to produce the system output governs the system's reliability overall. In this apparatus and method, only the active functions of an application are performed in FPGA 4, which can be configured as it operates, while the inactive functions are stored in an external ROM 6. The majority of the logic complexity therefore resides in inexpensive, dense ROM. As a result, the failure rate for FPGA 4, counter 7, and ROM 6 grows only slightly compared to fixed hardware solutions that implement the same amount of functionality. Gate counts are easily exceeded by a processor dedicated to executing software-based algorithms that could offer similar performance. Even so, high-speed processors are often possible only when they contain cache chips and memory management units. Thus highly complex solutions with many chips and boards would be expected. The present invention can provide an increase in the variety of fault tolerance algorithms whose complexity exceeds that of majority voting, as when correct results may not completely agree or a reasonableness check is performed. Through the use of ROM, which has among the lowest failure rates of all digital electronic components, FPGA 4 provides virtual IC support for fault tolerance and multiprocessing without accruing a significant reliability penalty to the system. Not only does the FPGA 4 off-load the overhead from the CMs 1, it accelerates it.

The apparatus and method of the present invention can be combined with conventional methods to use an FPGA as a custom computing resource. In particular, FPGA 4 is shared by the computing modules. When a computation is required that might otherwise take too much time in software, it can be carried out directly in the FPGA 4's specialized hardware.

Clearly many modifications and variations of the present invention are possible in light of the above teachings. It should therefore be understood that, within the scope of the inventive concept, the invention may be practiced otherwise than as specifically claimed.

What is claimed is:

1. Apparatus for fault-tolerant multiprocessing, which comprises:
    a plurality of computing modules;
    a plurality of memory modules connected to said computing modules;
    each of said memory modules having at least two ports;
    said plurality of computing modules being equal in number to said plurality of memory modules;
    at least one memory interface connected to each of said memory modules;
    at least one reconfigurable logic and switching device connected to said at least one memory interface;
    means for storing a plurality of configurations of said at least one logic and switching device;
    a counter connecting said logic and switching device to said means for storing; and
    said at least one logic and switching device comprising an array of individually reprogrammable cells configured so that a selected number of said cells can be reprogrammed to cause at least two of said plurality of computing modules to operate in fault-tolerant mode.

2. Apparatus as in claim 1, wherein said at least one logic and switching device is a field-programmable gate array (FPGA).

3. Apparatus as in claim 1, wherein said means for storing is a read-only memory (ROM).

4. A method for multiprocessing in hardware that compensates for faults, comprising the steps of:
    storing a plurality of configurations for a reconfigurable logic and switching device;
    partially reconfiguring said logic and switching device to accept at least one computation from at least one computing module;
    checking said at least one computation to determine whether it satisfies at least one test chosen from the group consisting of reasonableness and inexact voting; and
    transferring a result from said step of checking to said at least one computing module.

5. The method of claim 4, further comprising the step of initializing said reconfigurable logic and switching device after said step of storing.

6. The method of claim 5, wherein said step of initializing includes setting a counter to zero and incrementing said counter automatically to produce successive storage addresses.

7. A method for multiprocessing that compensates for faults in hardware, comprising the steps of:
    storing a plurality of configurations for a reconfigurable logic and switching device;
    partially reconfiguring said logic and switching device to accept at least two computations from at least two computing modules;
    comparing said at least two computations;
    detecting an error when results from said step of comparing fail to satisfy at least one test chosen from the group consisting of reasonableness and inexact voting; and
    producing an error detection signal from said step of detecting, thereby indicating a fault.

8. The method of claim 7, further comprising the step of initializing said reconfigurable logic and switching device after said step of storing.

9. The method of claim 7, wherein said means for initializing includes a counter initially set to zero and incremented automatically to produce successive storage addresses.

10. The method of claim 7, wherein said step of comparing at least two computations compares at least three computations; and
    said step of detecting further comprises choosing as said error that at least one computation whose value is in a minority among said at least three computations.

11. The method of claim 7, wherein said step of comparing at least two computations compares at least three computations; and
    said step of detecting further comprises choosing as said error that at least one computation whose value is furthest from a majority of said at least three computations.

12. The method of claim 7, wherein said step of comparing at least two computations compares at least three computations; and said step of detecting further comprises choosing said error by voting, where voting comprises successively matching every pair of said at least three computations and choosing as said error that at least one computation that matches least often.

13. Apparatus for multiprocessing in hardware that compensates for faults, which comprises:

means for storing a plurality of configurations for a reconfigurable logic and switching device;

means for partially reconfiguring said logic and switching device to accept at least one computation from at least one computing module;

means for checking said at least one computation to determine whether it satisfies at least one test chosen from the group consisting of reasonableness and inexact voting; and means for producing an error detection signal from said step of detecting, thereby indicating a fault.

14. Apparatus as in claim 13, further comprising means for initializing said reconfigurable logic and switching unit.

15. Apparatus as in claim 14, wherein said means for initializing includes a counter initially set to zero and incremented automatically to produce successive storage addresses.

16. Apparatus for multiprocessing that compensates for faults in hardware, which comprises:

means for storing a plurality of configurations for a reconfigurable logic and switching unit;

means for partially reconfiguring said logic and switching unit to accept at least two computations from at least two computing modules;

means for comparing said at least two computations;

means for detecting an error when results from said means for comparing fail to satisfy at least one test chosen from the group consisting of reasonableness and inexact voting; and means for producing an error detection signal from said means for detecting, whereby a fault is indicated.

17. Apparatus as in claim 16, further comprising means for initializing said reconfigurable logic and switching device.

18. Apparatus as in claim 17, wherein said means for initializing includes a counter initially set to zero and incremented automatically to produce successive storage addresses.

19. Apparatus as in claim 16, wherein said means for comparing at least two computations compares at least three computations.

20. Apparatus as in claim 19, wherein said means for detecting is effective for choosing as said error that at least one computation whose value is furthest from a majority of said at least three computations.

21. Apparatus as in claim 19, wherein said means for detecting is effective for choosing said error by voting, where voting comprises successively matching every pair of said at least three computations and choosing as said error that at least one computation that matches least often.

22. A method for reducing the duration of partial reconfiguration of a dynamically reconfigurable logic and switching device, which comprises the steps of:

selecting, within said logic and switching device, cells that accept n inputs from N computing modules, where $n \leq N$;

programming said selected cells to choose a majority from among said n inputs by a one of inexact majority voting and a reasonableness check, whereby only a minimum number of cells in said logic and switching device are reprogrammed.

23. The method of claim 22, comprising the additional steps of:

pairwise comparing of said majority with said n inputs;

determining from said step of pairwise comparing which ones of said n inputs disagree with said majority by a predetermined amount; and flagging said ones as errors.

* * * * *